July 22, 1952  C. B. HILL  2,604,381
METHOD FOR TESTING REFRIGERATING BRINES
Filed April 7, 1947
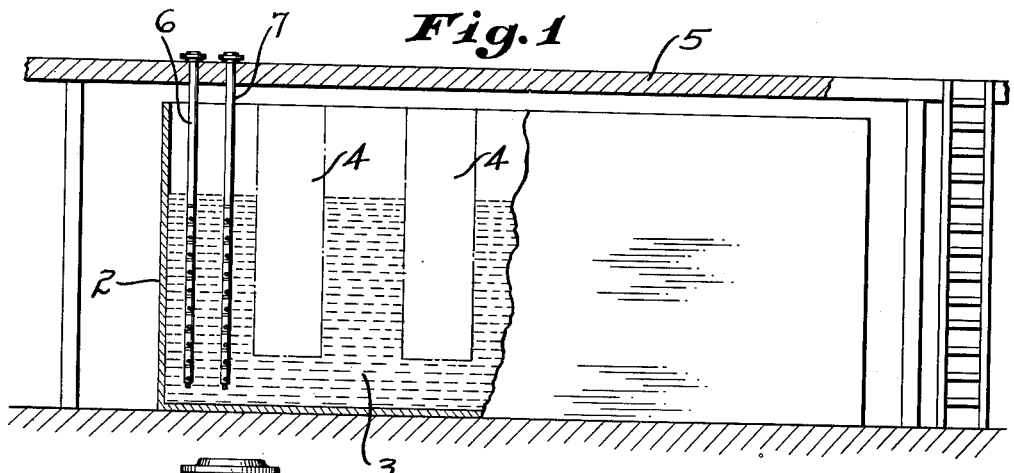
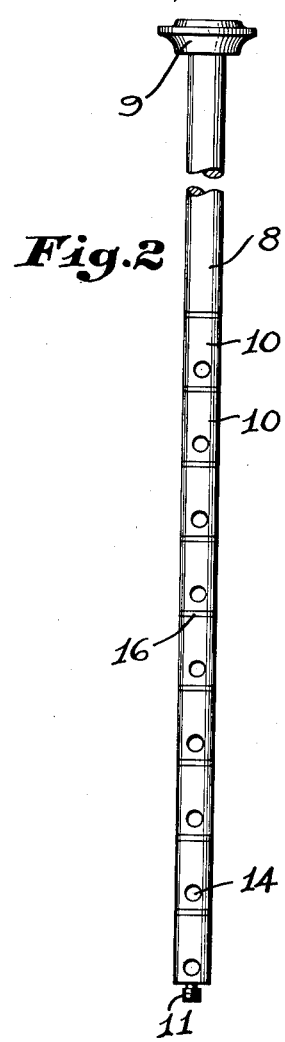
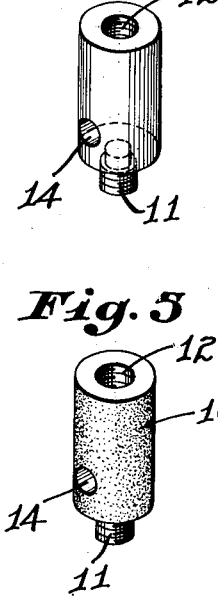
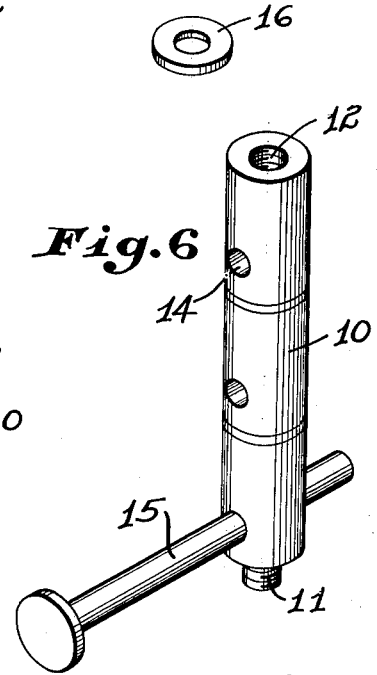
Inventor
Charles B. Hill
By Lyon & Lyon
Attorneys Patented July 22, 1952

2,604,381

UNITED STATES PATENT OFFICE 2,604,381

METHOD FOR TESTING REFRIGERATING BRINES

Charles B. Hill, Los Angeles, Calif., assignor to Hill Bros. Chemical Co., Los Angeles, Calif., a corporation of California Application April 7, 1947, Serial No. 739,938

3 Claims. (Cl. 23—230)

This invention relates to a method and a device for testing refrigerating brines for corrosive properties and is particularly directed to brines such as sodium chloride or calcium chloride brines used in ice plants. The process and apparatus are directed to determining when said brines have become corrosive to either the iron or steel or galvanized iron and steel of the tank or the ice containers which are in contact with said brine.

The brine tanks and ice cans used in refrigerating plants may be made to last substantially indefinitely, provided the refrigerating brine is maintained throughout operation in a non-corrosive state. However, frequently in the operation of refrigerating plants, the refrigerating brine is rendered highly corrosive, with the result that if this is not detected and corrected, the brine tanks and ice cans employed will be rapidly deteriorated and may be totally destroyed, in a relatively short period of time. The refrigerating brine will take on a corrosive property whenever, due to leaks in the ammonia system, there is ammonia leakage into the brine or whenever the brine becomes charged with air. The leakage in the packing of the centrifugal pumps used in handling the brine is a frequent cause for the introduction of air into the brine. By periodically testing refrigerating brine for corrosive properties, it is possible to detect such faulty operation of equipment and in some cases to make great savings in ammonia and also to preserve the equipment from corrosion. Whenever it is found that the brine is corrosive, this corrosive condition can be rectified by the use of suitable chemicals, such as chromic acid when the brine is found alkaline or caustic soda when the brine is found to be acid. In other cases, a neutral mixture of caustic soda and chromic acid may be added merely as a corrosion-inhibiting agent. When the brine is found to be corrosive, an analysis of the brine may be made to determine whether there is any ammonia leakage in the system.

It is an object of the present invention to provide a new, simple and effective method and apparatus for testing brines.

More particularly, in accordance with the present invention, the periodic testing of the brine for corrosion is effected by inserting into the brine a multiplicity of test members. These test members are preferably composed of the same material or substantially the same material as the tanks or cans, which come in contact with the brine. Before immersion in the brine, these test members are carefully weighed. At regular intervals, test members are withdrawn from the refrigerating brine and weighed, in order to determine, from any loss of weight, the corrosive character of the brine. Suitable periods for withdrawal are, for example, at monthly intervals and, monthly, there is preferably withdrawn a test member formed of each of the materials with which the brine is in contact. Usually it is sufficient to employ an iron or steel test member and a galvanized test member.

The present invention also includes a novel form of device for suspending such test members in the brine. This test device is constructed by providing each of the test members with suitable threaded pins and socket connections by which the plurality of test members may be attached together in the form of a single rod, requiring no other metal to be in contact with the test members. The rod is formed solely from the test members, with the addition of suitable washers or packing members designed to prevent the brine from coming in contact with the threaded connections of the test members. The test members are also preferably provided with suitable means, such as openings, so that each test member may be individually held by a suitable tool so that the test rod may be broken at any desired connection between the members. The assembled rod of test members may then, in turn, be threaded to a plain rod, which may be extended to the platform above the brine tank and serve to suspend the test members in the refrigerating brine.

By means of the testing devices of the present invention, it is possible to install the test members in very small spaces. The test members are kept in a predetermined order and maintained separate from any metal part, which would interfere with the significance of the intended weighing operations as a measure of the corrosive character of the brine.

The method and apparatus of the present invention will be more completely understood from a description of a preferred form or example of a method and apparatus embodying the invention and, for that purpose, I have hereafter described, in connection with the accompanying drawings, such a preferred example of the invention.

In the drawings:

Figure 1 is a somewhat diagrammatic elevation, partially in section of a brine tank equipped with the testing devices of the present invention;

Figure 2 is an enlarged elevation of one of the test rods;

Figure 3 is a further enlarged perspective view of a single test member;

Figure 4 is a perspective view of one of the washers or packing members employed between the test members;

Figure 5 is a perspective view, similar to Figure 3, illustrating the use of a galvanized test member; and Figure 6 is a perspective view of a number of the test members, illustrating the manner of inserting a tool for detaching the test members from each other.

Referring to the drawings, 2 generally indicates a tank holding a refrigerating brine indicated at 3, such as a solution consisting mainly of sodium chloride or calcium chloride; and 4 diagrammatically indicates ice cans suspended in the brine and 5 indicates the usual platform above the brine tank 2.

In accordance with the present invention, there is suspended from the platform 5, testing devices or rods, such as indicated at 6 and 7, respectively, which extend down into the brine 3. One of the rods 6 may have its test members, hereafter described, formed of steel of the same composition as the metal with which the brine 3 comes into contact, while the other rod 7 may have its test members galvanized, in accordance with any galvanized metal faces with which the brine 3 comes into contact.

Since the formation of rods 6 and 7 may be identical, except in the matter of the galvanized coating, the manner of forming only one thereof is hereafter illustrated. Each of the rods is composed of a suspending rod section 8 of a suitable length to extend from the platform 5 to below the level of the brine 3 in tank 2. At the upper end of these segments 8, the rod is provided with a disc member 9, to provide a flange on the rod by which the same may be suspended from the platform 5.

Below the suspension portion 8 of the rod, there are provided a plurality of individual test members 10, which may each be of duplicate construction.

Each of these test members, as illustrated more particularly in Figures 3 and 5 consists of a cylindrical body portion, preferably of the same diameter as the suspension section 8 and each is provided at its lower end with a reduced and threaded extension or pin 11.

Each is provided, at its upper end, with a threaded socket, such as indicated at 12, by which it may be threaded to the pin of an adjacent test member 10. There is likewise provided one of the threaded pins 11 on the end of the suspension section 8. Between each test member and its adjacent test member there is placed packing 16 which may be in the form of a washer but is so designed as to prevent the brine from coming in contact with the thread in connection with the test members. Each member is also provided with suitable means by which such member may be individually held or rotated in the operations of attaching or detaching the members from each other. Such means most simply perform by providing a diametric hole 14 through the members for the insertion of a rodlike tool, such as indicated at 15, in Figure 6.

Figure 3 illustrates a member formed of steel, while Figure 5 illustrates a member having a galvanized coating 16 thereon. In connecting the several members together and to the segment 8, there are provided packing members, such as indicated at 16, in the form of washers. These members are intended to prevent the penetration of the brine solution into the threaded joints. The use of such members is essential to the operation of the device as, otherwise, the threaded connections might become so corroded as to make separation of the members impossible, or so as to give a false weighing of the members if such corroded connections were broken.

In the use of the apparatus of the present invention, it will be readily seen that there has been provided a method for holding a number of individual test members in a predetermined relationship without requiring the introduction of other metal besides the test members into the brine or without requiring any fasteners apart from the test members.

As a result, the test members may be installed in very small spaces. A suitable practice is to provide twelve of the test members 10 on each rod, so that by uncoupling the lower member from each rod at the end of each month, a single rod may serve for servicing a brine tank for one year.

It is to be understood that each of the test members 10 is carefully weighed before being assembled into a testing rod or string. Records should then be kept of the weight of each of the test members on the testing device or string. In some cases, it is possible to secure sufficient of the test members 10 of duplicate weight so as to provide a testing string having all members of like weight. In other cases, the records of each individual member on the string should be preserved for a comparison with the weight of the members when withdrawn from the brine tank. As the members are periodically withdrawn from the brine tank, their weights are compared with their initial weights and the extent of corrosion thereby determined.

While the particular form of the invention herein described is well adapted to carry out the objects of the invention, various modifications and changes may be made and this invention is of the scope set forth in the appended claims.

I claim:

1. A method of testing brines for corrosion which consists first weighing separately each of a plurality of test members, then attaching such test members together to form a single rod, packing material being inserted between each test member, and then immersing in the brine such rod of test members attached one to the other and having packing material at their points of attachment and periodically removing and weighing one said test member from such rod.

2. A method for testing refrigerating brines for corrosion which comprises first determining the weight of a plurality of test members then coupling these test members together in the form of a rod with packing between the members to prevent contact of the brine with the coupling connections, inserting such rod into the brine the corrosive properties of which are to be determined, and periodically removing the lowest of said test member from the rod and weighing said member for comparison of its weight with the weight of the member before contact with said brine.

3. A process of determining the corrosive properties of refrigerating brines which are in contact with both steel surfaces and galvanized surfaces, which method comprises weighing a plurality of individual test members of steel and coupling said test members in the form of a rod having packing members at the couplings, weighing a plurality of test members having galvanized surfaces and coupling such test members in the form of a second rod with packings between the individual test members for protection of the couplings, inserting both test rods so formed into the refrigerating brine to be tested, thereafter periodically removing each rod from the brine, removing one test member from each rod, reinserting the remainder of the rod, and weighing said test members for comparison with their weight before contact with the brine.

CHARLES B. HILL.

REFERENCES CITED

The following references are of record in the file of this patent:

UNITED STATES PATENTS

| Number | Name | Date |
|---|---|---|
| 1,433,860 | Spenser | Oct. 31, 1922 |
| 1,663,356 | Smith | Mar. 20, 1928 |
| 1,926,925 | Wescott | Sept. 12, 1933 |
| 2,059,175 | Myracle | Oct. 27, 1936 |
| 2,364,822 | Schneider | Dec. 12, 1944 |